Figure 1:
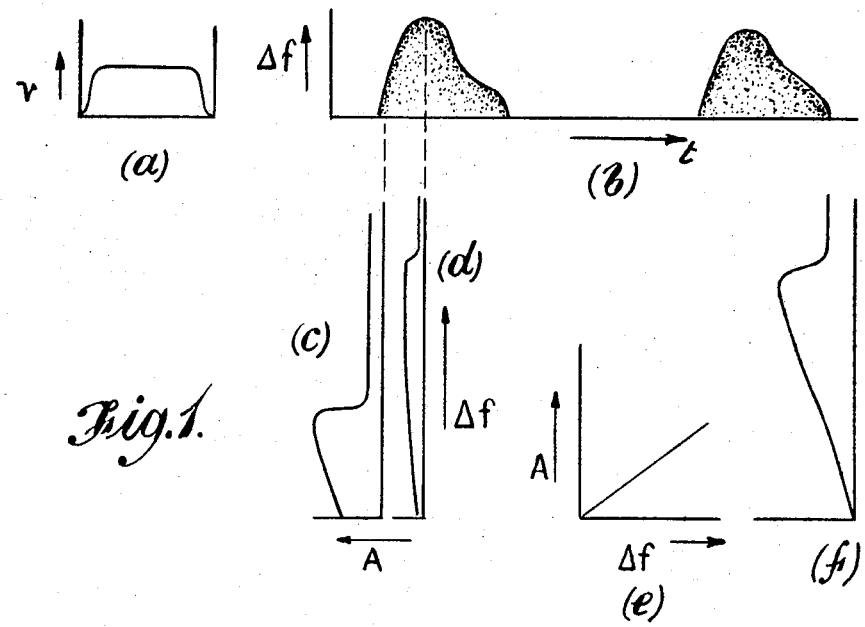
Figure 1:
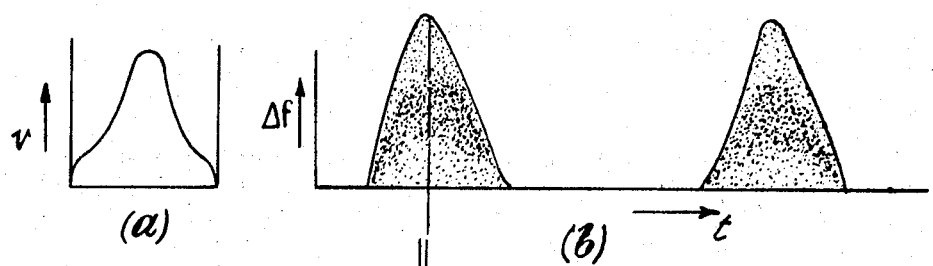

United States Patent [19]
Light

[11] 3,710,792
[45] Jan. 16, 1973

[54] DOPPLER SHIFT ULTRASONIC VASCULAR FLOWMETER EMPLOYING ENERGY CONTENT OF REFLECTED WAVE

[75] Inventor: Leon Henry Light, London, England

[73] Assignee: National Research Development Corporation, London, England

[22] Filed: March 3, 1970

[21] Appl. No.: 16,106

[30] Foreign Application Priority Data

March 5, 1969 Great Britain......................11,825/69

[52] U.S. Cl..............................128/2.05 F, 73/194 A
[51] Int. Cl. ................................................A61b 5/02
[58] Field of Search........128/2.05 F, 2.05 V, 2.05 R, 128/2.06 G, 2.06 R, 24 A; 73/194 A, 67.7, 67.9, 69

[56] References Cited

UNITED STATES PATENTS

| | | | |
|---|---|---|---|
| 3,498,290 | 3/1970 | Shaw et al.........................128/2.05 F |
| 3,269,173 | 8/1966 | Von Ardenne........................73/67.9 |
| 3,568,661 | 3/1971 | Franklin............................128/2.05 F |
| 3,554,030 | 1/1971 | Peronneau........................128/2.05 F |
| 3,443,433 | 5/1969 | Liston et al.........................73/194 A |
| 3,430,625 | 3/1969 | McLeod, Jr......................128/2.05 F |
| 3,310,049 | 3/1967 | Clynes..............................128/2.05 |
| 2,912,856 | 11/1959 | Kritz..................................73/194 A |
| 2,669,121 | 2/1954 | Garman et al......................73/194 A |
| 3,334,622 | 8/1967 | Brech......................................128/2 |

OTHER PUBLICATIONS

Gosling, R. G. et al. Ultrasonics for Industry, Oct. 1969, pp. 16–23.

*Primary Examiner*—Kyle L. Howell
*Attorney*—Cushman, Darby & Cushman

[57] ABSTRACT

A transcutaneous Doppler flowmeter, for blood flow measurement in the region of the ascending aorta, comprises an electro-acoustic transducer assembly and means for processing the transmitted and received signals to extract and exhibit substantially the maximum instantaneous frequency shift as determined by a relatively rapid decrease in the spectral power density with increasing frequency in a plot of spectral power density against frequency. Particular reference is made to a water filled ultrasonic transducer to reduce refraction losses at the transducer/tissue interface, and also to a multi-track spectrographic recorder to facilitate on-line operation.

18 Claims, 7 Drawing Figures

PATENTED JAN 16 1973 3,710,792

SHEET 2 OF 2

DOPPLER SHIFT ULTRASONIC VASCULAR FLOWMETER EMPLOYING ENERGY CONTENT OF REFLECTED WAVE

This invention concerns blood flow measurement and more particularly such measurement by transcutaneous Doppler flowmeters.

Such flowmeters are relatively simple in principle. They comprise an electro-acoustic transducer assembly including mutually spaced transmitter and receiver, usually in the form of piezoelectric crystals. This assembly is placed on the skin adjacent a vascular channel to be investigated and an ultrasonic beam directed diagonally through the skin and channel by the transmitter. Part of the beam is back-scattered to the receiver by reflecting media and the difference in received signal frequency from transmission frequency represents the speed of movement of the relative media. Generally speaking the reflecting media other than the blood in the channel will be relatively stationary and so the difference frequency signal, which can be separated by beating the received signal with the transmitting signal, represents the blood flow.

This discussion of principle is an over-simplification relative to practical circumstances which are complicated by various factors. For example; the media surrounding the channel will not necessarily be absolutely stationary; the blood flow will rarely be uniform across the channel, but more usually vary in a somewhat indeterminate manner from minimum speeds adjacent the channel walls to maximum speeds towards the center of the channel; and the angle at which the transmitted beam traverses the channel will be a factor in determining the difference frequency of reflected signals. In practice then the difference frequency signal has a relatively complex structure having a bandwidth extending from zero to a maximum frequency representing the speed of those corpuscles which are travelling fastest. Nevertheless the technique under discussion has been proposed for use in a variety of circumstances, such as involving consideration of peripheral blood flows, in which an experienced operator can obtain useful information by listening to the difference frequency signals presented in audio form.

An object of the present invention is to apply a similar technique to consideration of blood flow in the great vessels leaving the heart, more particularly in the ascending aorta and aortic arch, and in some circumstances in the pulmonary artery. Initial development of the invention has rested on, and is to a large extent still concentrated on, appreciation of the fact that the thoracic aorta bends through approximately 180° before it joins the heart, and that the blood flow gradient transversely of the aorta in this region is relatively uniform at least to the extent that there is a major cross-sectional area of maximum flow at a speed which, normally, significantly exceeds that of other media movement in that region. Thus, it is possible to project a beam from an external transducer to pass substantially tangentially through the thoracic bend and thereby produce a signal containing components with frequency shifts, the maximum frequency shift at any one time then representing the maximum aortic blood speed present at that time.

In one aspect, the present invention provides a transcutaneous Doppler flowmeter comprising an electro-acoustic transducer assembly and means for processing the transmitted and received signals to extract and exhibit substantially the maximum instantaneous frequency shift as determined by a relatively rapid decrease in the spectral power density with increasing frequency in a plot of spectral power density against frequency. The mode of exhibition should allow the maximum frequency shift present at any one time to be recognized by eye or, alternatively, means can be provided for displaying directly the value of the instantaneous maximum frequency shift.

In use the transducer assembly is located to project a beam through the region of the first, second or third intercostal space, about 2 – 5 cm. to the left or right of the body mid-line, and moved over this region with slight variation in angling to produce a "maximum" signal output from the processing means. For study of aortic flow, beam projection through the second intercostal space and to the right of the body mid-line is found to be more commonly successful. Projection to the left of the body mid-line gives a result depending to a lesser or greater degree on pulmonary flow, and this leads to the possibility of studying pulmonary flow when the associated elements in the results can be distinguished from any arising from aortic flow, as is in fact the case with some abnormalities.

Considering more particular aspects of apparatus suitable for use in realization of the present invention, the transducer assembly will normally differ in some respects from those which have been used previously in connection with the measurement of blood flow in peripheral vessels.

In the case of the present invention the transmission frequency needs to be optimized between the fact that the signal proportion reflected by blood increases with frequency, while the signal absorption in tissue rises with frequency. In this connection it is noted that development of the invention preferably involves a frequency of about 2 Mc/s, and in any case not higher than 4 Mc/s. In the case of peripheral flows on the other hand, the relevant vessels are not deeply located, so that signal absorption has not been taken into account as a factor of prime significance and transmitted frequencies have usually been within a range from 5 to 10 Mc/s.

Further differences in the transducer assembly, more particularly in the transmitter part thereof, can arise from the need to locate the relevant vessel and maximize the signal output. The first of these factors was initially considered to lead to a requirement for a broader transmitter than is normal in peripheral flow investigation, consistent of course with the ability to effect useful contact with a patient's chest. Indeed, it has been considered that the beam may be slightly divergent on the basis that appropriate location is detected when a major part of the beam is aligned tangentially with the aortic arch or within a small angle of such alignment, variation of frequency shift for a non-aligned ray being a cosine variation which results in a reduction of only about 6 percent for an angle of 20°. While this consideration is still generally valid, further experience shows use of a collimated, narrower beam to be useful in maximizing the desired signal output. This last point arises from the fact that, while any beam partly aligned tangentially, or nearly so, with the aortic flow will produce a maximum frequency component representing the maximum blood flow, lower frequency components can have such a high amplitude as to overload the associated processing circuits. A collimated, narrower beam can be located to reduce these high amplitude, low frequency components which otherwise arise from specular reflection.

One is accordingly led to an idealized requirement for beam projection with variable collimation, and the present invention further provides for this purpose an ultrasonic transducer assembly comprising a telescopic cylindrical baffle through which the transmitted beam emerges and reflected signals are received.

Turning to the question of the signal processing means, it is convenient to clarify the desired function for this means by reference to the apparatus which has been used in initial development of the invention. Such development has involved a so-called speech analyzer which includes a variable frequency narrow bandwidth filter through which a sample "length" of a signal to be analyzed is passed repeatedly, while the filter is progressively adjusted to accept an increased frequency for each signal pass. The resultant output signal for each pass is recorded graphically by a stylus moved relative to common axes representing the original input signal time against frequency. At the same time the record made by the stylus is varied in density, in the sense of variation from white, through grey, to black, in accordance with the amplitude of the filter output signal. More particularly, this density variation involves use of an electro-sensitive paper and a stylus through which a variable current is passed to the paper. In the result a spectral record of signal time, frequency, and power density is obtained in the form of a variable density.

While clearly useful, a disadvantage of this more particular spectral record producing technique is that it does not produce a full result in real time relative to the input data. This disadvantage can be overcome by use of a number of filters representing the successively adjusted states of the originally proposed single filter, the group of filters having the input signal applied thereto in parallel and being associated with respective styli whereby to effectively produce a multi-track recording in real time.

For this last purpose the present invention further provides a multi-track transducer device comprising a plurality of first electrodes of one polarity arranged in a mutually spaced linear array for transverse passage of electro-sensitive record medium thereacross, consumable second electrode means of opposite polarity to said first electrodes, and means for driving said second electrode means towards and/or across said first electrodes in alignment therewith to maintain engagement between said first electrodes, said medium and said second electrode means.

The second electrode means is preferably of strip form drivable with one edge passing adjacent and in alignment with said array of first electrodes, and biassed towards engagement with the array. More particularly, it is preferred that this strip be of continuous loop form. An equivalent arrangement can involve a set of individual second electrodes drivable "end on" towards respective first electrodes, but this is less preferable in view of the added complexity of structure.

Preferably the first electrode array is provided by way of a plurality of parallel strips of conductive material mounted in or on flexible insulating material and exposed in a transverse portion to form said array. The insulating material flexibility is advantageous in association with a consumable electrode strip since the array electrodes are independently movable to take account of small non-uniformities in the strip form.

The consumable electrode means will normally be the anode of the device for use with electrolytic paper as record medium. However, polarity reversal may be appropriate with other suitable media.

Figure 2:
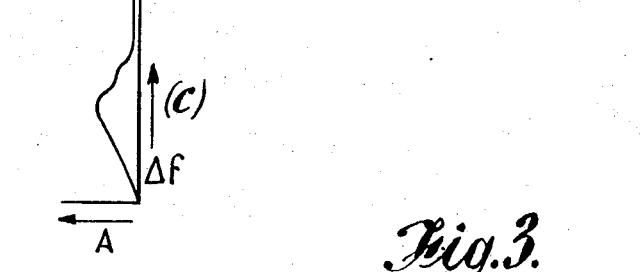
Figure 3:
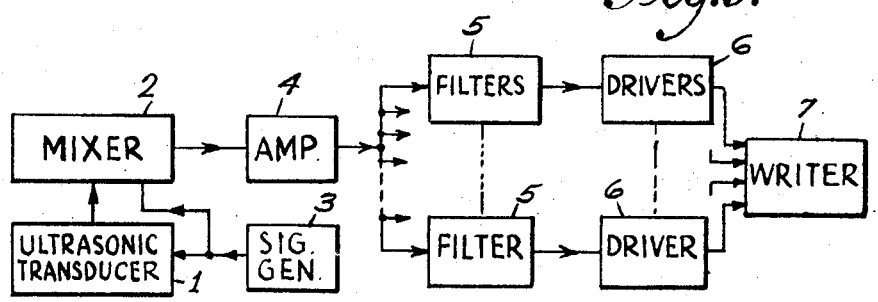
Figure 4:
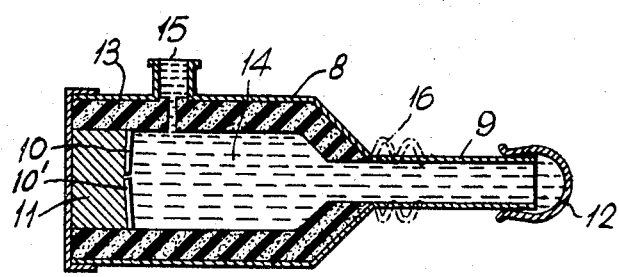
Figure 5:
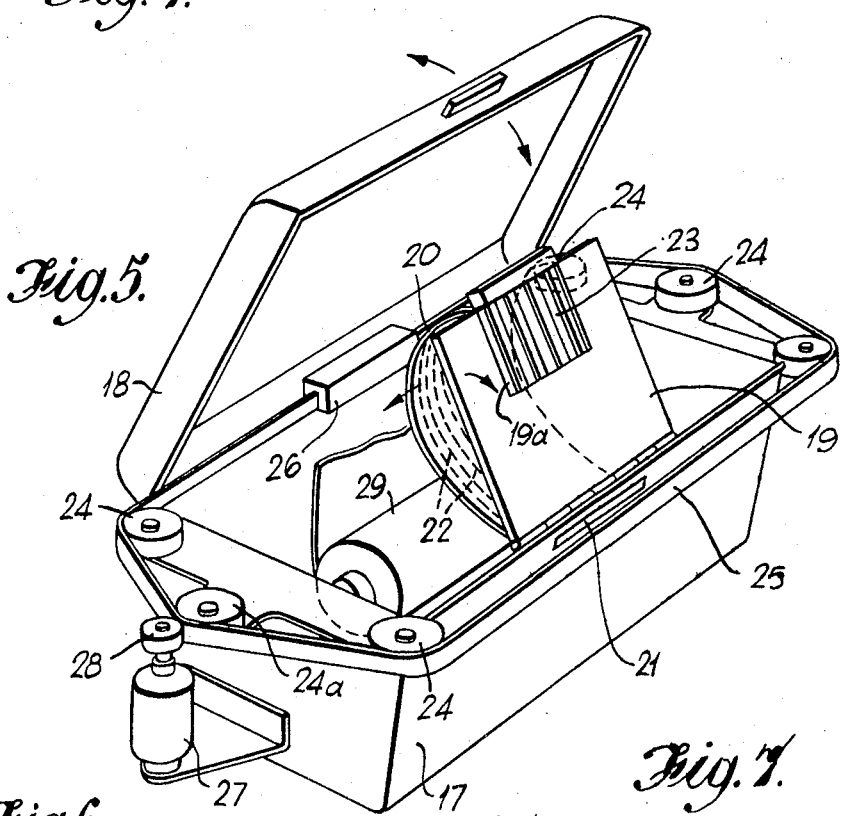
Figure 6:
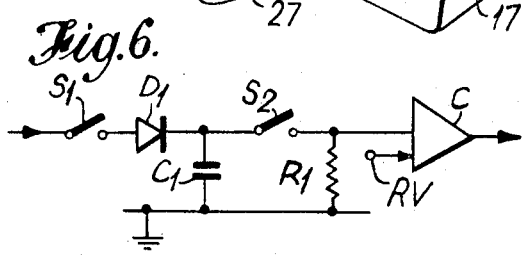
Figure 7:
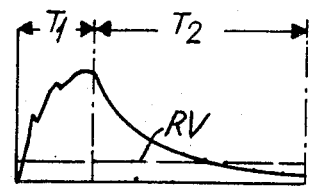

Further clarification of the forms of record which can be obtained by use of the present invention, and also of apparatus according to the invention, will be gained from the following consideration of the accompanying drawings which are given by way of example, and in which:

FIG. 1 graphically illustrates various characteristics associated with use of the present invention in association with normal aortic flow, FIG. 2 similarly illustrates characteristics associated with an abnormal aortic flow, FIG. 3 schematically illustrates one form of apparatus according to the invention, FIG. 4 diagrammatically illustrates an ultrasonic transducer suitable for use in the apparatus of FIG. 3, FIG. 5 diagrammatically illustrates an output transducer device suitable for use in the apparatus of FIG. 3 to produce a spectral record, FIG. 6 illustrates part of FIG. 3 in more detail, and FIG. 7 graphically illustrates the mode of operation of the part of FIG. 6.

FIG. 1 shows at (a) the blood flow velocity profile transversely of the aorta in the region under consideration for a normal subject, and at (b) an associated from of spectral record as can be produced by the invention, where $t$ is the original signal time and $\Delta f$ is the frequency shift. Also in FIG. 1, (c) and (d) show the power density or amplitude A variation with frequency at two points along one of the cardiac cycle pulses at (b). These last two figures clearly show a rapid fall in amplitude with increase in frequency in substantially stepped manner down to a low amplitude level representing noise. The maximum frequency shift of interest is the shift in the step region and is clearly recognizable as a boundary region in the spectral record. The flattening and stretching of (d) relative to (c) arises from the fact that there is the same amount of blood in the aorta at any time during the pulse although the velocity varies. This results in a slight reduction in contrast for the pulse boundary in the region of its peak, but this can be compensated by appropriate amplification in accordance with a characteristic such as shown at (e) whereby (d) becomes as (f) in FIG. 1.

FIG. 2 illustrates the corresponding situation where the aortic flow has a jet-stream as a result of a constriction in the region of the relevant cardiac valve, for example. The aortic flow profile is thus of the form at (a) and is recognizable by variation of the spectral record to the form at (b) with a secondary boundary at higher level than the basic pulse, consistent with modified amplitude/frequency characteristic approaching a double-stepped form as at (c) in FIG. 2.

FIGS. 1 and 2 are, of course, given as examples of the manner in which abnormalities can be detected by use of the invention, but they are by no means exclusive of other signal and characteristic forms which can arise under various circumstances.

FIG. 3 schematically illustrates an on-line spectral analyzer and recorder apparatus. In FIG. 3 the ultrasonic transducer assembly (discussed further hereinafter with reference to FIG. 4) is indicated at 1 connected to a suitable mixer 2 in which the signals generated by a signal generator 3 and transmitted by the assembly 1 are mixed with the signals received by the assembly 1 to produce a beat signal output. This output is applied to a broadband amplifier 4 having a frequency range of 150 to 3,000 Hz, for example, and in which pre-emphasis is effected to compensate for the slight variation in contrast which otherwise arises as discussed in connection with FIG. 1(e). The output from amplifier 4 is applied in parallel to 19 narrow bandpass filters 5 having respective frequency bands 150 to 300 Hz, with successive 150 Hz steps, up to 2,850 to 3,000 Hz. The outputs of filters 5 are applied to respective logarithmic drivers 6 (discussed more fully hereinafter with reference to FIGS. 6 and 7), and the drivers feed a 19-electrode array multi-track output transducer 7 (discussed more fully hereinafter with reference to FIG. 5), the array being fed to retain across the electrode array the stepped succession of narrow band frequency ranges from which the driver outputs originate.

FIG. 4 diagrammatically illustrates an ultrasonic transducer which has been developed for use with the present invention. The transducer comprises a metal body 8 from one end of which projects a cylindrical baffle or nozzle 9. At its other end the body 8 houses transmitter/receiver piezo-electric crystals 10 and 10' respectively and circuits 11 directly associated therewith. The nozzle is closed by a very thin rubber membrane 12, held on the nozzle by an O-ring or other suitable clamp (not shown). The inner walls of the body 8 are lined with material 13, such as "Neoprene," suitable to absorb radiation from the transmitter crystal 10 and thereby obviate undesired ultrasonic reflections. The remaining space within the body and nozzle is filled with water or other liquid 14 having similar refractive properties to tissue relative to the relevant ultrasonic radiation. This serves to reduce losses which otherwise arise with transmission between the transducer and a patient, and it is to be noted that the membrane is sufficiently matched and thin not to give rise to significant losses in this respect.

The liquid 14 should be pressurized to extend the membrane 12 thereby affording good contact with a patient. This pressurization can be effected with a hypodermic or equivalent liquid injection device by way of a self-sealing entry port 15 of known form, and any liquid losses through the membrane 12 can be compensated in the same way.

The elimination of reflections within the body and use of the nozzle 9 give a degree of collimation of transmitted beam which will depend on the length of the nozzle. It is possible to vary this degree of collimation, as proposed above, by making the nozzle telescopic in any suitable manner. This may require the provision of a variable capacity reservoir forming a sealed system with the body to take account of the varied amount of liquid 14 in the nozzle. However, this may not be essential if the telescopic action is obtained by way of a bellows section, as indicated in broken outline at 16, in the nozzle whereby the volume within the bellows is constant.

Such an ultrasonic transducer assembly having a variable collimation facility may well find application outside that of the present invention.

The device of FIG. 5 comprises a bin 17 having a generally rectangular cross-section with a lid 18 pivotally connected along one edge of the bin mouth. A platen 19 is pivotally connected adjacent the opposite edge of the bin mouth from the lid 18. The lid and platen are coupled together by way of linkages and cams, or in any other suitable manner (not shown), to move in the sense of the associated arrows such that upon closure of the lid over the bin mouth, the platen is lowered below the lid, in substantially parallel disposition thereto, and translated towards the pivotal axis of the lid. Such structures are in fact already employed in commercially available paper transport mechanisms for use in ECG recorders.

In the present case, the platen 19 carries, on a resilient pad 19a, one end of a multiple electrode strip 20, the relevant end portion of the strip being secured adjacent the outer edge of the platen while the remainder of the strip passes below the platen in a curved path for connection at its other end to a terminal block 21 mounted on the bin wall adjacent the pivoted end of the platen.

The strip 20 is of printed circuit form, in the more general sense of the latter term, comprising a plurality of parallel, mutually spaced copper strip conductors 22 encased in flexible electrically insulating plastics material to mutually isolate the conductors. A suitable material for strip 20 is available under the name "Biccastrip." The conductors 22 are exposed by removal of part of their insulated covering transverse the platen to provide an array of spaced parallel electrode strip 23. The conductors 22 at the other end of the strip 20 are exposed for connection to respective terminals of the block 21.

A plurality of guide rollers 24 are mounted around the bin mouth to support and drive a closed loop stainless steel anode strip 25 which passes through a channel in a guide block 26 adjacent the lid pivotal axis. One of the rollers 24, indicated at 24a, is rotatable by an electric motor 27 to drive the anode 25, pinch roller 28 being associated with roller 24a. One or more of the rollers 24 may be biassed away from the bin to maintain the anode in tension and thereby ensure support in its illustrated disposition.

The guide block 26 having U-shaped section for passage of the anode 25 therethrough is so disposed, and the platen movement is so arranged, that closure of the lid 18 locates the electrodes 23 below the block 26 with the lowermost edge of the anode 25 disposed substantially perpendicularly across the electrode array to define a linear array of small inter-electrode gaps.

In the presently proposed use of the device, a roll of electrolytic paper, or other suitable electro-sensitive record media, is located in the bin as indicated in broken outline at 28 and the lid 18 closed so that the end of the paper passes out of the bin between the platen 19 and block 26 more particularly between the anode and electrode array, parallel to the longitudinal axes of the strip electrodes 23. Currents which are a measure of successive frequency band components of a signal for analysis and display are applied between adjacent electrodes 23 and the common anode 25 through the paper 29. The paper 29 is uniformly withdrawn from the bin, at a rate consistent with the desired time scale for recorded data, and the paper is acted upon to provide a multi-track spectral recording as discussed above. The anode potential is conveniently, although not necessarily, applied by way of the guide block 26, and it is important to note the required polarity for the strip 25 to act as an anode.

The reason for this last point is that recording with opposed electrodes engaging electrolytic paper involves erosion of the positive electrode. Clearly, it is undesirable to have the multi-track electrode array eroded: hence the proposed common anode with its translation across the array to facilitate and reduce the cost of the replacement necessitated by erosion and to ensure generally uniform erosion. It is possible that use of an elongate anode strip with reciprocatory translation across the array would be satisfactory in some circumstances, but the risk of error arises by virtue of the non-uniform erosion which will eventually occur at the end portions of such an anode. A closed loop anode with unidirectional and continuous translation during use is accordingly preferred since no "end effects" can occur.

It will, of course, be appreciated that the anode is biassed outwardly from the guide block 26, or the block 26 itself is suitably biassed towards the platen when the lid is closed on the bin to maintain engagement of the anode with the paper.

A typical arrangement for a driver 6 as in FIG. 3 is indicated by FIG. 6 and comprises a series connection of a first switch S1, rectifier shown as a diode D1, and a second switch S2 feeding a comparator C in parallel with a reference voltage input RV. The rectifier D1 is associated with a storage capacitor C1 connected between ground and the junction of rectifier D1 and switch S2, and a leakage resistor R1 connected between ground and the junction of switch S2 and comparator C. The mode of operation of this driver is illustrated by FIG. 7.

The driver is operated in a cyclic manner of which a first phase of time T1 involves closure of switch S1 and opening of switch S2 whereby the relevant filter 5 output charges capacitor C1. During the subsequent second phase of time T2 completing the driver cycle of operation, the switch states are reversed whereby the charge on capacitor C1 leaks away through resistor R1 and applies an exponentially decaying voltage input to the comparator C. During this second phase, the comparator C operates to provide a predetermined constant output while its decaying voltage input exceeds a level determined by its reference voltage input RV. The components and times T1, T2 are chosen such that while the capacitor is largely charged in time T1 to the immediate peak level of input signal, the decaying voltage will just reach the reference level in time T2 when the capacitor C1 has been charged to a voltage corresponding to the upper limit of the dynamic range of the system and the total cycle time (T1 + T2) permits at least one full cycle to occur as the record medium of the associated recording transducer moves by a distance equal to the thickness of the transducer anode. The record medium speed of movement and the thickness of the anode should, of course, be such as to give a resultant record definition suited to the required degree of record analysis.

These last points are best clarified by way of example with reference to the characteristics of an apparatus/device embodiment consistent with the above description. The relevant frequency data is as mentioned above; times T1 and T2 for the drivers are 0.5 ms. and 1.5 ms., respectively, giving a cycle time of 2.0 ms.; the anode thickness is 1 mm.; and the electrolytic paper record medium moves at 10 cm/s. This means that the driver completes two cycles of operation during the time that a given point on the paper traverses the thickness of the anode. The mark/space ratio of the driver output signal varies between a maximum of 3:1 and a minimum of zero dependent upon the immediate peak level of filter output signal.

It will be appreciated that the current effective between any electrode of the array and the strip anode is of a predetermined level and that the tonal variation in the resultant record arises from the variation in timing of such currents by way of the variable mark/space ratio application. However, the level of the relevant current can itself be adjusted such that the black level in the resultant record is achieved by a shorter mark/space ratio than the maximum possible with given driver circuits. In this way, the system effectively has a contrast control.

Returning to more general considerations: the resultant spectrographic record obtained by use of the invention will exhibit regions defined by visually identifiable boundaries for the areas which are of direct interest, since the regions in question represent the systolic blood pulse flow and the area of such a region represents the stroke-volume of the left ventricle of the heart. It should be possible to evaluate the areas of the relevant regions by direct manipulation of the electrical signal data used in producing the spectrographic record when there are no significant artifacts due to random noise or heart wall movement, for example, which might otherwise not be readily distinguished. When such artifacts are present, the regions of interest can still be readily distinguished by visual examination of the spectrograph, and it is proposed that the more particular output transducer device discussed above be used in an interrogating mode as well as a recording mode, by passage of a spectrograph therethrough which has had the boundaries of interest defined during visual examination with a trace of material of distinctive electrical characteristics, the device electrodes serving to detect the traced material, and hence the boundaries, and thereby generate and/or control signals representing the relevant regions.

For example, the regions of interest on a spectrograph produced with a device according to the invention can have their boundaries traced with a "soft pencil lead." The pencil lead is to be of good electrical conductivity and each boundary is to be connected to a conductive reference line along one side of the graph, such as the heart pulse base line in the present instance. The paper is then passed through the device in a reading mode with one of the electrodes of the array or an additional or "spare" electrode contacting the reference line, and with a potential of one polarity applied to that electrode and potentials of opposite polarity applied to the other electrodes of the array to give rise to a current through the traced boundary and reader circuit of the array electrode concerned, which current operates a respective bistable device. The bistable device will operate to one state when the leading boundary of a region of interest passes an array electrode and to the other state when the trailing boundary of that region passes the same electrode. Thus, the bistable device produces a distinctive output during the time an area of interest is scanned by the associated electrode, and such outputs can be integrated to provide a representation of the regional area.

Clearly, other electrical properties and tracing arrangements can be used for the boundary tracing materials which are distinctive relative to the spectrograph in its untraced state, such as conductive or high resistance material for d.c. operation between the array electrodes and anode in the case where the paper can be impregnated or is conductive, respectively, or distinctive dielectric constant material for a.c. operation between the array electrodes and anode, for example.

A further more general point is that the invention as so far discussed will not serve to distinguish between opposite directions of flow, that is to say, it is not direction sensitive. However, direction sensitivity can be provided by use of the method described by F.D. McLeod in a paper entitled "A Directional Doppler Flowmeter" at the 7th International Conference on Medical and Biological Engineering, 1967, Stockholm, or the first method described by P.A. Perroneau and F. Leger in a paper entitled "Doppler Ultrasonic Pulsed Blood Flowmeter" at the 8th such Conference, 1969, Illinois. The latter method, which involves mixing an additional frequency $(f + a)$ with the basic transmitted frequency $f$ to obtain a showing of frequency shift $\Delta f$ in respect of flow in both directions through a vessel and $(a - \Delta f)$ in respect of flow in only one direction, thereby enabling opposed flow components to be distinguished. One disadvantage with this technique is that significant artifacts can arise in the region close to frequency $a$ as seen after mixing. This is preferably obviated by provision of a very narrow band or so-called "notch" filter following the mixer to reject $a$. A notch filter to reject frequency $f$ in the high frequency part of the circuit can also be used to advantage when it is desired to observe direction of flow.

A further consideration is that it may also be desirable or useful to use a "range gating" technique in some circumstances.

While the analysis and recordal apparatus has been described more particularly with reference to aortic blood flow measurement and analysis, it will be appreciated that it is also applicable to use in other situations where generally similar analysis and recorded display are required or can be useful, such as EEG, analysis of heart sounds, and speech analysis.

It is to be appreciated that other arrangements than those more particularly described with reference to the drawings are useful in application of the present invention. This applies not only to the transducer device for which alternatives are mentioned in the earlier introductory passages, but also to the associated electronics. For example, use of a parallel array of filters and drivers in one-to-one relation with the transducer electrode array is not essential and other forms of apparatus, such as digital filtering apparatus, can be used.

Also, the record itself can be produced in other ways, such as by using a stylus or styli which produce an electrostatic pattern for processing as in xerography, pen recorder type styli which are variably oscillated in accordance with amplitude whereby a boundary envelope is recognizable such as in FIG. 1(b) or 2(b), and so on.

Again it is not essential that an overall spectral record, or an approximation thereto, be produced since the primary interest lies in the boundary regions corresponding to a relatively rapid rate of change of amplitude with frequency shift. Thus it would be adequate to track the relevant boundaries. This could be done by connection with a suitably programmed computer as part of the processing means, or in any other suitable manner.

The possible variations in the apparatus of the invention are such that a readily portable form thereof for bed-side use is envisaged as a practicable proposition.

Lastly, it will often be appropriate to use the invention for blood flow measurement in conjunction with other more conventional apparatus such as for producing an ECG. It will then be useful to record a mark on the spectral record denoting phase relation with the ECG or other associated data.

I claim:

1. A transcutaneous Doppler flowmeter for measuring blood flow comprising:

a transducer assembly including a pair of juxtaposed piezoelectric crystals, a generator means connected to one of said crystals for producing an ultrasonic frequency alternating voltage to cause said one crystal to radiate an ultrasound wave therefrom, a mixer means connected to said generator and the other of said crystals for heterodyning said alternating voltage from said generator with alternating voltages from said other crystal generated by the reception thereat of reflected ultrasound waves from said one crystal, and thereby to produce at an output a Doppler shift signal, a plurality of narrow bandpass filters spanning respectively successive frequency bands within a predetermined frequency range, and connected in parallel to said output of said mixer for providing at an output of said filters respective Doppler shift frequency band signals, circuit means connected to the output of each of said filters for each providing an output signal representing the power of said Doppler shift frequency band signals, and display means connected to said circuit means for receiving said output signals and for producing a real-time, two-co-ordinate, effectively three-dimensional visual display representing in one co-ordinate direction the Doppler shift frequency progressions of input signals thereto, in the other co-ordinate the time progression of input signals thereto, and as effective spectral density variations the power of the Doppler shift frequency band signals.

2. A flowmeter according to claim 1 further including amplifier means connected between said mixer and said filters for amplifying said Doppler shift signal.

3. A flowmeter according to claim 1 wherein said display means comprises: a plurality of first electrodes of one polarity arranged in a mutually spaced array along said one co-ordinate direction; a terminal respectively connecting said circuit means with said first electrode; consumable second electrode means of opposite polarity to said first electrode locatable closely adjacent said first electrodes to span the same along said one co-ordinate direction; and a strip of electro-sensitive, paper-like record medium mounted for movement in said other co-ordinate direction between and in engagement with both said first electrodes and said second electrode means.

4. A flowmeter according to claim 3 wherein said second electrode means comprises a single strip-form electrode and means for driving said strip-form electrode longitudinally with one edge thereof passing nearest said first electrodes.

5. A flowmeter according to claim 4 wherein said single strip-form electrode is of closed loop form.

6. A flowmeter according to claim 3 wherein said first electrodes comprise a plurality of parallel strips of conductive material supported in a common body of flexible electrically insulating material and exposed in a transverse portion to form said array.

7. A transcutaneous Doppler flowmeter comprising:
means for producing an ultrasonic wave and for applying said wave to an exterior body location so that said wave propagates into the body and is reflected with a Doppler shift reflecting the velocity of flow within a vascular channel,
means for receiving the reflected ultrasonic wave and producing an electrical signal having a characteristic which varies as a function of the received energy at each of a plurality of discrete frequency ranges, and
recording means for receiving said electrical signal simultaneously and producing a record indicating the received energy at each of said discrete ranges.

8. A flowmeter as in claim 7 wherein said producing means includes ultrasonic transducer for a transcutaneous Doppler flowmeter comprising:
means for housing an ultrasonic wave transmitting liquid, and having a telescoping extending nozzle,
means within said housing for producing an ultrasonic wave, and
means mounted on the end of said nozzle adapted for coupling said ultrasonic wave to a body portion.

9. A flowmeter as in claim 8 wherein said housing means includes a hollow bellows defining said telescoping nozzle.

10. A flowmeter as in claim 8 wherein said coupling means includes a diaphragm sealing said end of said nozzle.

11. A flowmeter as in claim 8 wherein said transducer further includes means defining a passage through said housing for adding liquid thereto.

12. A flowmeter as in claim 8 wherein said producing means includes first and second transducers.

13. A flowmeter as in claim 8 wherein said transducer further includes means lining the interior of said housing means for absorbing radiation from said ultrasonic wave producing and applying means.

14. A flowmeter as in claim 8 wherein said receiving and electrical signal producing means includes a plurality of filters.

15. A flowmeter as in claim 8 wherein said recording means includes:
a plurality of electrodes of a first polarity disposed in a spaced array and connected to said receiving and electric signal producing means so that each said electrode has applied to it a potential which varies as a function of the received energy in one of said frequency ranges,
second electrode means disposed adjacent said plurality of electrodes so as to define a plurality of matrix locations each associated with one of said frequency ranges, and
means mounting a record medium for movement between said first plurality of electrodes and said second electrodes and said second electrode means for producing said record indicating the energy at each of said discrete ranges.

16. A flowmeter as in claim 15 wherein said second electrode means includes a closed loop of a single strip-form consumable electrode.

17. A flowmeter as in claim 15 wherein said plurality of electrodes comprise a plurality of parallel strips of conductive material.

18. A flowmeter as in claim 15 wherein said receiving and electric signal producing means includes:
means for producing an ultrasonic alternating voltage,
means for mixing said ultrasonic alternating voltage,
a plurality of narrow band pass filters, and
means for applying the mixed signal to said filters.

* * * * *